United States Patent [19]

Romankiw

[11] 3,853,715

[45] Dec. 10, 1974

[54] ELIMINATION OF UNDERCUT IN AN ANODICALLY ACTIVE METAL DURING CHEMICAL ETCHING

[75] Inventor: Lubomyr Taras Romankiw, Briarcliff Manor, N.Y.

[73] Assignee: International Business Machines Corporation, Armonk, N.Y.

[22] Filed: Dec. 20, 1973

[21] Appl. No.: 426,862

[52] U.S. Cl. .......................... 204/15, 156/11, 156/18

[51] Int. Cl. .......................... C23b 5/48

[58] Field of Search .................. 204/15; 156/11, 18

[56] References Cited

UNITED STATES PATENTS 3,700,445 10/1972 Croson .............................. 156/11

3,723,210 3/1973 Jacksen .............................. 156/11

3,745,094 7/1973 Greene .............................. 204/15

*Primary Examiner*—T. M. Tufariello

*Attorney, Agent, or Firm*—George Baron

[57] ABSTRACT

The preparation of a discrete and well-defined pattern of metal or alloy of uniform thickness and composition of magnetic properties by plating the alloy or metal onto a conductive surface which contains narrow photoresist frames outlining the outer edges of the pattern.

8 Claims, 5 Drawing Figures

ELIMINATION OF UNDERCUT IN AN ANODICALLY ACTIVE METAL DURING CHEMICAL ETCHING

BACKGROUND OF THE INVENTION

When electroplating Ni-Fe or other kindred alloys, the composition of the alloy is dependent on the local current density of the plating system. It is well known that, when large areas are masked while smaller and different sized or nonuniform areas are plated, it is practically impossible to selectively deposit such areas with uniform film thickness, uniform alloy composition and magnetic properties. This is readily seen if one assumes an area of 100 cm$^2$ to be electroplated using a plating current of 100 ma. The current density $i_d = 100$ ma/$100_2$ cm$^2$ or 1 ma/cm$^2$. However, if regions $r_1$, $r_2$ and $r_3$ of the 100 cm$^2$ surface are masked out during the plating process, then the current density $i_d$ = ,/[100−($r_1$+$r_2$+$r_3$) ]or > 1 ma/cm$^2$ for such regions $r_1$, $r_2$ and $r_3$.

When fabricating memories, magnetic sensing devices, or the like of Ni-Fe or similar alloys, failure to achieve correct composition in the alloy results in poor magnetic properties. As a consequence, in the art of electroplating materials whose composition structure must be accurately controlled in order to achieve uniformity of performance, conventional masking techniques are ineffective. What was done in the prior art, in dealing with the plating of an alloy whose composition was dependent on local current density, was to plate the alloy in sheet form and then etch the sheet into desired patterns. However, when depositing films by electroplating, it is necessary to employ an adhesion layer between the alloy and the substrate that will support the alloy pattern. Since on certain adhesions layers, it is not possible to electroplate, it is necessary to deposit a thin layer of fairly noble metal, such as Au, Pt, Pd, Cu, Ni, etc., on the adhesion layer.

Unfortunately, many adhesive layers and plating base layers that are compatible with the magnetic alloy and the substrate become cathodic to the magnetic alloy during etching, producing severe undercutting. For example, copper or nickel-iron are made adhesive to glass or silicon by interposing a thin layer of chromium or titanium between either the copper or nickel-iron and its associated substrate. When such plural layers are etched, a severe undercut is observed in the etched metal. Such undercutting is due to three separate effects taking place during etching and is neither reproducible nor controllable. The undercutting is due to the fact that the chemical etching is an accelerated form of corrosion. The corrosion is isotropic in principle; it should take place at equal rates both normal to the thickness of the etched metal and parallel to the thickness. This results in uniform undercutting of the metal.

However, as film thickness and desired pattern dimensions become very small, the dimensions of metal crystallites and grains cannot be ignored. The grain boundaries and the grains etch at different rates, resulting in ragged edges. As grain size of the etched material becomes comparable to the dimension of the etched pattern, the raggedness assumes an ever-increasing significance. Finally, during the terminal stages of etching, when the adhesion and/or the plating base metal layers are exposed due to plated metal removal by the etching solution and as a result of its dissimilar metals, such as copper, nickel, iron or nickel-iron, chromium, titanium or gold are present together, a galvanic cell is set up between the dissimilar metals, which results in extremely rapid etching of the anodic metal. In case of titanium and chromium, each of these metals passivates extremely quickly and becomes cathodic to nickel, nickel-iron and to the metals of the iron group. When the metals such as platinum, palladium, gold or copper are present in the sandwich with the iron group metals, it is obvious that they would act cathodic to the iron group metals and the etching of Ni, Ni-Fe, etc., would be impossible to control.

Obviously such undercutting is detrimental to the making of batch-fabricated arrays of very thin closely spaced, parallel conductors or metallic elements which must have uniform properties.

SHORT DESCRIPTION OF THE INVENTION

In order to achieve such uniform etching of multilayered electroplated depositions without the accompanying undercutting, the present invention places a very narrow border of photoresist on top of a cathodic adhesive metal layer prior to electroplating the desired anodic metal, wherein said narrow border closes upon itself to serve as a frame. A second photoresist layer is deposited, exposed and developed so as to be present only over the anodic material and also protrudes beyond the outer borders of the photoresist frame. In effect, the anodic layer, i.e., permalloy, is completely encapsulated with photoresist so that subsequent etching of the surplus anodic material not needed in the ultimate pattern leaves the desired portions of the pattern free from attack, avoiding the undercutting that occurs when two or more dissimilar metals are subjected to a common etchant.

DETAILED DESCRIPTION OF THE INVENTION

In many technologies, such as in the batch fabrication of thin film recording heads, bubble memory devices, Josephson junctions and the like, the width of the top of a metal strip must equal the width of the bottom of that metal strip. The tolerances are so close that even small variations in size between the top and lower surface of a thin layer seriously interfere with the operation of the completed device. In the production of such metal strips, chemical etchants must be used in conjunction with photolithographic techniques, which etchants cause significant undercutting in the region where two or more dissimilar metals are in contact. The manner in which such undercutting is eliminated can be taught by examining FIGS. 1–4 in sequence.

Figure 1:
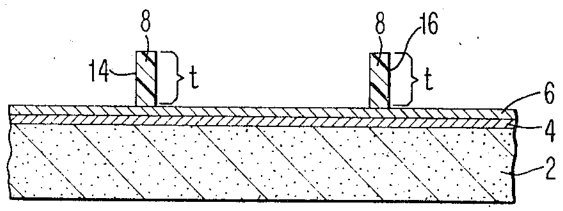
FIG. 1 represents an initial state of the invention.
Figure 2:
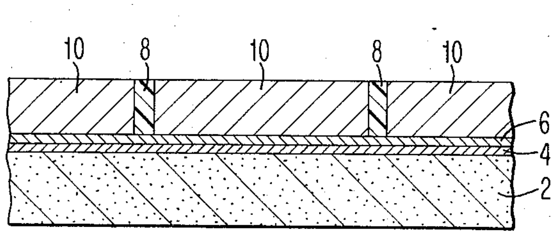
FIGS. 2, 3 and 4 show subsequent steps in the method of obtaining sharp lines of multilayered metal wherein the defects of undercutting are eliminated despite the use of chemical etchants for attacking all the metals in the multilayered line.
Figure 3:
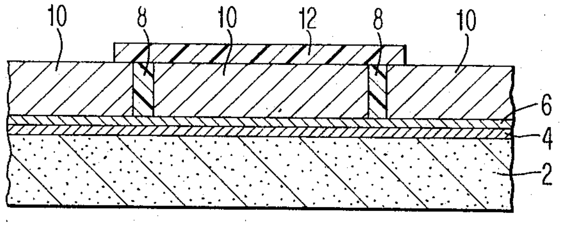

In FIG. 1 (or FIG. 5), the desired circuitry is built upon a substrate 2 of silicon dioxide, glass, or other similar self-supporting insulating materail. On top of substrate 2 is deposited a thin layer of adhesion metal 4, and examples of such metal are chromium, titanium, tantalum, tungsten, niobium or aluminum. Such adhesion metal 4 is used primarily to make the main metal of interest, referred to as the anodic metal, be adherent to the substrate. Since one cannot readily electroplate or electrolessly plate on such adhesion layer, it is desirable to subsequently metalize the adhesion layer 4 with readily platable metal 6 such as Au, Pt, Pd, Cu, Ni, Ni-Fe, or with a metal alloy. In certain instances when the substrate 2 can be heated, it is possible to employ a single metal or alloy, such as Ni, Ni-Fe, cobalt and the like which serve both as an adhesive layer and as a plating base. Such adhesion layer 4 and conductive layers 6 can be applied by sputtering, evaporation, or in any other manner.

A thickness *t* of photoresist 8 is deposited by conventional lithographic techniques and commercially available products are obtainable from Shipley Company, Inc., of Wellesley, Mass. or Eastman Kodak Company of Rochester, N.Y. An acceptable photoresist is identified by the Shipley corporation as AZ1350H or AZ1350J. The choice of photoresist is made in accordance with its ability to avoid damage to the final product being made during the stripping of the photoresist from the cathodic layer 6. The residual strips 8, after the layer of photoresist has been exposed, through a mask not shown, to ultraviolet radiation, will, after the unexposed portions have been washed away by a suitable photoresist etchant, are 0.1 to 0.2 mils wide. Such narrow border of photoresist 8 outlines the final pattern or patterns (see FIG. 5). The width of this border represents less than 10 percent of the area of the final spot to be etched and should preferably be kept down to 1 – 2 percent of the final lateral dimension of the etched spot. Practically the dimension of this strip should be between 2.5 and 10 $\mu$m, and preferably ~2.5 to 5.0 $\mu$m. Such widths can be as narrow as 1.0 to 0.5 $\mu$ if electron sensitive resist is used to form the pattern using an electron beam. Because of practical considerations it is preferred to keep the height of the resist $\leq$ width of the frame. Consequently when electron beam resist is used and 0.5 $\mu$ wide frames are formed, the height of the deposited metal may have to be held to ~ 0.5 to 0.8 $\mu$.

After the photoresist borders 8 have been prepared, the required thickness of the anodic material 10, such as the alloy permalloy, which is used frequently for the manufacture of magnetic recording heads, is deposited. The allow film 10 is electroplated and such plating will only affect the local thickness distribution for about 0.2 to 0.3 mils away from the edge of the resist 8, if the width of the strip is smaller than 0.2 mils, and likewise affect the composition and magnetic properties of the film 10. Since the resist is only about 0.2 mils wide, the plated film 10 thickness variation near the edge of the photoresist 8 has been measured to be less than 5 percent and the variation in the Fe of the permalloy (Ni-Fe) has been measured to be less than 10 percent of the iron content of the permalloy composition being plated, i.e., 20percent Fe ± 1percent. In effect, by using such narrow photoresist frames 8, the composition (Fe-Ni) thickness and variation from local current density will be substantially negligible.

After plating of permalloy layer 10 has been completed, another photoresist layer 12 is applied, by conventional photolighographic techniques, to the top of the anodic metal 10. The mask used for exposure of layer 12 need not be aligned with great care for photoexposure and can extend a fraction of a mil beyond the outer edges 14 and 16 of frames 8. When the excess anodic metal 10 that lies outside the photoresist frames is etched away (Fe $Cl_3$ being a suitable etchant for Fe-Ni), the photoresist borders 8 and 12 encapsulate the pattern desired. Such resist borders 8 and 12 prevent the active metal Fe-Ni from being etched while in the presence of cathodic metal such as chromium, titanium, gold, etc. After the more active metal 10 was etched with the $FeCl_3$, the plating base metal 6 and the adhesion layer 4 are etched with suitable chemical etchants. Subsequently the photoresists 8 and 2 are removed i.e., using acetone in case of Shipley resist. The remaining narrow stripe of the plating base 6 and the adhesion layer 4 plus any residue from chemical etching are then removed by a conventional short sputter etch.

Figure 4:
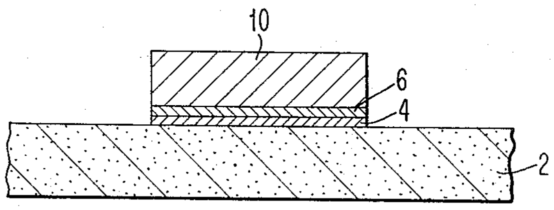
Figure 5:
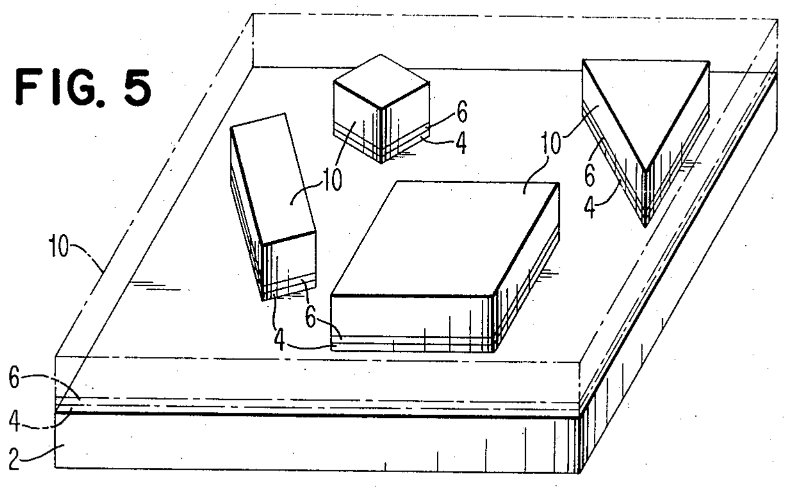
FIG. 5 is a perspective view of a completed structure made in accordance with the teachings of the invention.

Alternatively after completion of the etching of Fe-Ni, the Shipley resist is removed by acetone and the sample is subjected for r a short period of time to conventional sputter etching to remove the plating base and 6 and the adhesion layer 4. FIGS. 4 and 5 illustrate the end results of the removal of all materials save the patten desired.

The protective technique described hereinabove, although especially useful where current densities for electroplating magnetic alloys must be uniform throughout the plated layer, is equally applicable where the anodic metal 10 is an elementary metal such as copper. It has been found that the invention applies even to those instances where the anodic elementary metal film 10 is deposited by evaporation. In such cases, the photoresist borders 8 should be between 1.2 to 2 times the thickness of the evaporated metal 10 to avoid the undesired undercutting between anodic and cathodic metals.

The invention shown and described herein is a method that is of particular value when one must use two superimposed metallic layers, the lower layer being an adhesive layer for the upper conductor layer, or the lower layer being an essential element of a device that employs the upper layer and such two layer consist of dissimilar metals. The invention also is of particular value when the alloy whose composition is dependent on local current density is to be deposited over said lower layer. By employing a very thin framework about the edges of a pattern that is to be plated by such alloy and then protecting the top of such desired pattern when etching of the undesired alloy portion takes place, three highly desired features are obtained, namely, (1) the avoidance of unercutting between the metals that are highly dissimilar; (2) the uniform thickness and compositional plating of the alloys despite the different areas of the patterns being plated; and (3) extremely precise pattern definition, as good as the optical exposure of the photoresist 8. Even further improvement in hermetic sealing can be realized by heating the Shipley 1350 H or 1350 J resist quickly (for ~ 1 to 2 minutes) to 150° or 160°C. prior to completion of the etching process. Such heating makes the resist 8 and 12 flow and seal any crack or openings in the resist regions 8 and 10 which may have developed during etching.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method for fabricating a metallic pattern on a substrate comprising the steps of a. depositing a first thin metallic layer on an inert substrate, b. placing a very narrow self-supporting border of a given height of photoresist material on such metallic layer, said border outlining the configuration of subsequent second metal to be deposited on said thin metallic layer, said subsequent second metal becoming anodic with said first metallic layer during its etching, c. depositing said second metal on said first metal, d. depositing a photoresist layer only over said anodic material that forms the pattern of interest, and e. chemically etching away all the anodic material not encapsulated.

2. A method for fabricating a metallic pattern on a substrate comprising the steps of a. depositing an adhesion and/or plating base material which becomes cathodic during a subsequent etching process on an inert substrate, b. placing a very narrow self-supporting border of a given height of photoresist material on such cathodic material, said border outlining the configuration of subsequent anodic material to be deposited on said cathodic material, c. electroplating anodic material on said cathodic material up to a height that is no greater than that of the photoresist material, d. depositing a photoresist layer only over said anodic material that forms the pattern of interests, said photoresist layer extendingto said border of photoresist material so as to encapsulate said anodic material that forms the pattern of interest, and e. chemically etching away all the anodic material not encapsulated.

3. The method of claim 2 wherein said anodic material is a transition metal alloy from the family that includes Fe-Ni, Fe-Ni-Cr, Fe-Ni-W, Fe-Ni-Mo, Fe-Ni-Co, and Ni-Co.

4. The method of claim 1 wherein the said self-supporting border that outlines the desired pattern is as small as 0.5 $\mu$ in width.

5. The method of claim 1 wherein the border width is less than 10 percent of the area of the anodic material that forms the pattern of interest.

6. The method of claim 1 wherein the border width is between 1–2 percent of the area of the anodic material that forms the pattern of interest.

7. A method for fabricating a metallic pattern on a substrate comprising the steps of a. depositing an adhesion and/or plating base material which becomes cathodic during a subsequent etching process on an inert substrate, b. placing a very narrow self-supporting border of a given height of photoresist material on such cathodic material, said border outlining the configuration of subsequent anodic material to be deposited on said cathodic material, c. heating said photoresist for 1 to 2 minutes to seal said photoresist layers to one another, and d. electroplating anodic material on said cathodic material up to a height that is approximately equal to the height of the self-supporting border, e. depositing a photoresist layer only over said anodic material that forms the pattern of interest, said photoresist layer extending to said border of photoresist material so as to encapsulate said anodic material that forms the pattern of interest, and f. chemically etching away all the anodic material not encapsulated.

8. A method for fabricating a metallic pattern on a substrate comprising the steps of a. depositing an adhesion and/or plating base material which becomes cathodic during a subsequent etching process on an inert substrate, b. placing a very narrow self-supporting border of a given height of photoresist material on such cathodic material, said border outlining the configuration of subsequent anodic material to be deposited on said cathodic material, c. heating and photoresist for one to two minutes to seal said photoresist layers to one another, and d. electroplating anodic material on said cathodic material up to a height that is approximately equal to the height of the self-supporting border, e. depositing a photoresist layer only over said anodic material that forms the pattern of interest, said photoresist layer extending to said border of photoresist material so as to encapsulate said anodic material that forms the pattern of interest, and f. sputter etching away the adhesion and plating base layers.

* * * * *